United States Patent [19]

Kaiser

[11] Patent Number: 4,701,012
[45] Date of Patent: Oct. 20, 1987

[54] OPTICAL MULTIPLEXER/DEMULTIPLEXER

[75] Inventor: Manfred Kaiser, Hemmingen, Fed. Rep. of Germany

[73] Assignee: Standard Elektrik Lorenz, Stuttgart, Fed. Rep. of Germany

[21] Appl. No.: 722,572

[22] Filed: Apr. 11, 1985

[30] Foreign Application Priority Data

Apr. 12, 1984 [DE] Fed. Rep. of Germany ....... 3413703

[51] Int. Cl.⁴ ................................. G02B 6/34
[52] U.S. Cl. ............................. 350/96.19; 350/96.16; 350/171
[58] Field of Search ............... 350/96.15, 96.16, 96.18, 350/96.19, 164, 166, 170, 171, 172, 173, 174, 401, 403; 370/3

[56] References Cited

U.S. PATENT DOCUMENTS 3,501,640 3/1970 Harris ....................................... 370/3
4,420,219 12/1983 Muchel ............................ 350/96.18

FOREIGN PATENT DOCUMENTS

| 130047 | 11/1978 | Japan | 350/96.15 |
| 25045 | 2/1980 | Japan | 350/96.15 |
| 130504 | 10/1980 | Japan | 350/96.19 |
| 137303 | 10/1981 | Japan | 350/96.15 |
| 137302 | 10/1981 | Japan | 350/96.19 |
| 109916 | 7/1982 | Japan | 350/96.15 |
| 68713 | 4/1983 | Japan | 350/96.15 |
| 149019 | 9/1983 | Japan | 350/96.15 |
| 149018 | 9/1983 | Japan | 350/96.15 |
| 166320 | 10/1983 | Japan | 350/96.19 |
| 2098353 | 11/1982 | United Kingdom | 350/96.15 |

Primary Examiner—William L. Sikes
Assistant Examiner—Frank González
Attorney, Agent, or Firm—Christie, Parker & Hale

[57] ABSTRACT

The multiplexer/demultiplexer consists of a plurality of elements (105, 106, 107, 108) made of optically transparent material which are cemented together and on which filter layers (101, 102, 103, 104) are deposited so as to form wavelength-selective beam splitters.

14 Claims, 5 Drawing Figures 4,701,012

OPTICAL MULTIPLEXER/DEMULTIPLEXER

FIELD OF THE INVENTION

The present invention relates to an optical multiplexer/demultiplexer comprising a beam splitter.

BACKGROUND ART

Such multiplexer/demultiplexers are known per se. They are suitable for combining two signals differing by the wavelengths of their carrier waves into one signal and for dividing such a signal into its two components.

DISCLOSURE OF THE INVENTION

The object of the invention is to provide a multiplexer/demultiplexer for more than two wavelengths.

This is accomplished by utilizing a series of beamsplitters each adjusted to a different wavelength with each successive beamsplitter being in the direction of the principal ray from the previous beamsplitter.

The novel multiplexer/demultiplexer is suitable for both single-mode and multimode applications. It makes it possible to multiplex/demultiplex a large number of beams (channels) having different wavelengths. Both optical waveguides and transmitters or receivers are connectable to it.

In one preferred embodiment, wavelength separation is improved since the direction of polarization of the component beam to be coupled to the respective beam splitter clearly differs from the polarizations of the other component beams in that the beam splitter has the highest reflectance for this polarization.

The novel multiplexer/demultiplexer is easy to manufacture. The individual manufacturing operations can be performed for several components at a time. If a performance test after manufacture is necessary at all, it will, as a rule, be sufficient to test a single component of each lot.

BRIEF DESCRIPTION OF THE DRAWINGS

The invention will now be explained in more detail, by way of example, with reference to the accompanying drawings, in which.

BEST MODE FOR CARRYING OUT THE INVENTION

The novel multiplexer/demultiplexer is a reciprocal component, i.e., without any change in its structure, it can be used both as a multiplexer for combining light beams (channels) of different wavelength and as a demultiplexer for separating the previously combined beams. The terminals (also called "gates") of the multiplexer/demultiplexer are inputs or outputs, depending on the mode of operation. For the following description of the operation of the component, the "demultiplexer" mode has been chosen.

During demultiplexing, a light beam is divided into its component beams. Each component beam has a given wavelength or occupies a given wavelength range. In the following, for both cases, only one (given) wavelength will be referred to for simplicity. If the novel multiplexer/demultiplexer is used in optical communication, each component beam corresponds to a channel.

Figure 1:
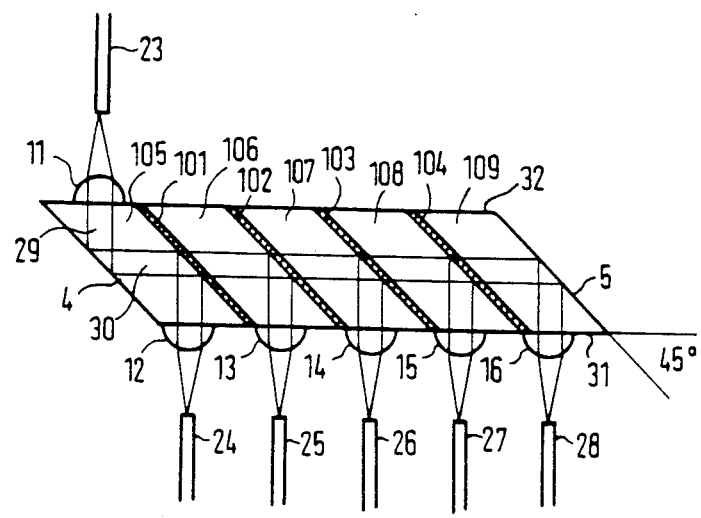
FIG. 1 shows a longitudinal section through a multiplexer/demultiplexer and the light path.

The novel demultiplexer will be explained with the aid of FIG. 1. A light beam arriving in an optical waveguide 23 is composed of a plurality of component beams each having a different wavelength. The function of the demultiplexer is to divide this light beam into its different component beams. The light emerging from the optical waveguide 23 is directed to a lens 11, which produces a parallel light beam. This beam is coupled into the demultiplexer.

The demultiplexer has the shape of a parallelepiped. FIG. 1 shows a longitudinal section through the parallelepiped which is taken in such a direction that it has the shape of a parallelogram. The demultiplexer consists of several elements 105, 106, 107, 108, and 109. On the side opposite that where the light enters, these elements (with the exception of the last element in the direction of the principal-ray path, i.e., the element 109) are coated with filter layers 101, 102, 103, and 104. These filter layers are designed to have a high reflection factor for one component beam of a particular wavelength while being transparent to other wavelengths. In the longitudinal section, the individual elements have the shape of a parallelogram, and the long sides of the parallelograms are inclined to the principal-ray direction. As a result, the individual elements (except the last element 109) act as wavelength-selective beam splitters. Each of the beam splitters reflects that portion of the light beam (component beam) which has the wavelength to which the beam splitter is adjusted.

The hemisphere lens 11 is located on the upper side 32 of the demultiplexer. It renders the light beam emerging from the optical waveguide 23 parallel, as mentioned above, and this parallel beam enters the demultiplexer in a direction perpendicular to the surface 32. After its entry, the beam (29) is deflected through 90° at the left-hand side 4 (left-hand element 105) of the demultiplexer, either by total reflection or by a reflective coating deposited on the surface 4. After the deflection, the light beam 30 propagates in a direction called "prinicpal-ray direction". It strikes the individual wavelength-selective beam splitters one after the other. The beam splitters are inclined to the principal-ray direction at an angle of 45°. At the first beam splitter 101, that portion (component beam) of the light beam is reflected which has the wavelength to which the beam splitter is adjusted. This component beam is deflected through 90° in the direction of the other side 31 of the demultiplexer i.e., the side opposite the upper side 32. It leaves the demultiplexer on this side 31, is focused by a hemisphere lens 12, and coupled into an optical waveguide 24. The same takes place for the component beams of the remaining light beam (which no longer contains the component beam with the first wavelength) at the other beam splitters. At each of the beam splitters, one component beam is reflected, and these component beams pass through lenses 13, 14, 15, 16 and are coupled into further optical waveguides 25, 26, 27, 28.

There is one beam splitter less than the number of component beams into which the light beam striking the demultiplexer is divided. After passing through the last beam splitter 104, the light beam is only one component beam of a given wavelength, because the other component beams were already deflected by the other beam splitters in the direction of the side 31 of the demultiplexer. Therefore, it suffices to deflect the last component beam through 90°, which occurs at the right-hand side 4 of the demultiplexer. This last component beam then passes through the hemisphere lens 16 and is coupled into the optical waveguide 28.

The multiplexer/demultiplexer was described here as used as a demultiplexer, because the light beam coming from the optical waveguide 23 is divided by the device into its component beams. When the device is operated as a multiplexer, several component beams coming from the optical waveguides 24, 25, 26, 27, and 28 are deflected through 90° at the individual beam splitters 101, 102, 103, 104 and at the right-hand side 5 of the device, and are thus combined in the principal-ray direction. The light beam emerging at the left-hand side 4 of the multiplexer contains all component beams and is deflected at this left-hand side 4 through 90° onto the hemisphere lens 11, passes through the latter, and is coupled into the optical waveguide 23.

In the embodiment it is assumed that the individual elements and, consequently, the individual beam splitters are inclined to the principal-ray direction at 45°. However, this is not necessary; other inclination angles are also possible. It must only be ensured that the individual component beams reflected by the beam splitters, after leaving the demultiplexer, are coupled into the individual optical waveguides in a suitable manner. The individual beam splitters need not be arranged parallel to each other; however, a parallel arrangement simplifies the manufacture of the novel multiplexer/demultiplexer.

In the above description, no reference was made to the polarization. The polarization can be used to advantage for improving the isolation between the component beams, particularly component beams with adjacent wavelengths.

The individual elements 105, 106, 107, 108 and 109 are made of an optically active material. It is known that such a material rotates the plane of polarization of a light beam, the amount of the rotation being dependent on, inter alia, the wavelength of the beam (see, for example "Lehrbuch der Physik" by Gerthsen, 13th edition, Springer-Verlag, Berlin 1977, pp. 397 and 398). The thickness of an element depends on the wavelength of the component beam to be coupled out by the associated beam splitter and is chosen so that the plane of polarization of this component beam is so rotated on the way on the beam splitter that for this component beam, the polarization-dependent reflectance of the beam splitter is higher than that for the other component beams. The same applies analogously to the other component beams on their ways to the other beam splitters, it being necessary to take into account the total distance travelled, i.e., the distance from the entry into the demultiplexer to the respective beam splitter.

The demultiplexer is particularly efficient if all component beams incident on it are circularly polarized.

A particularly advantageous manufacturing method will now be explained with the aid of FIG. 2.

Figure 2A:
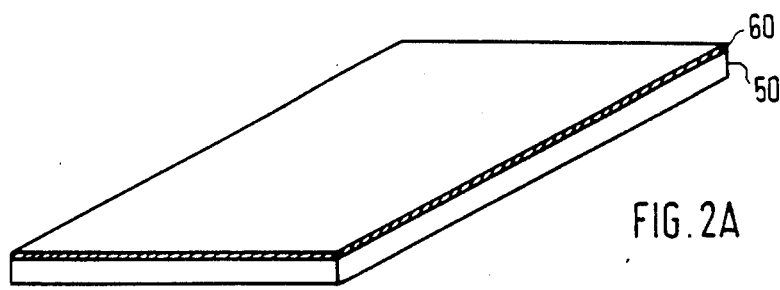
FIGS. 2a to 2d are sketches serving to explain the manufacturing method.
Figure 2B:
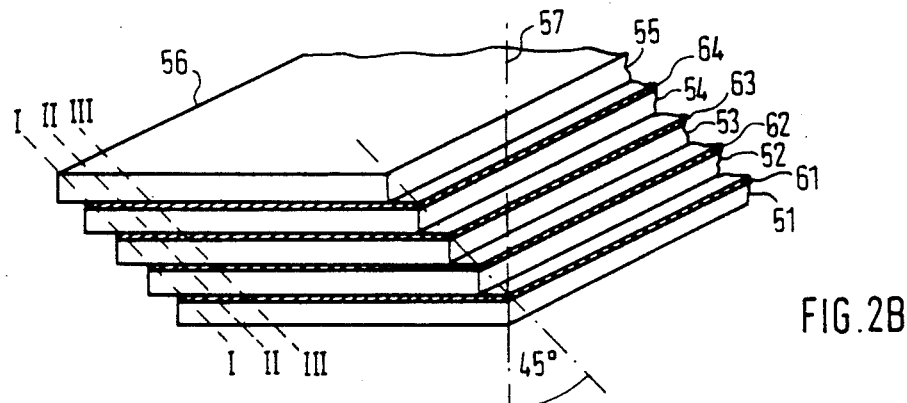
Figure 2C:
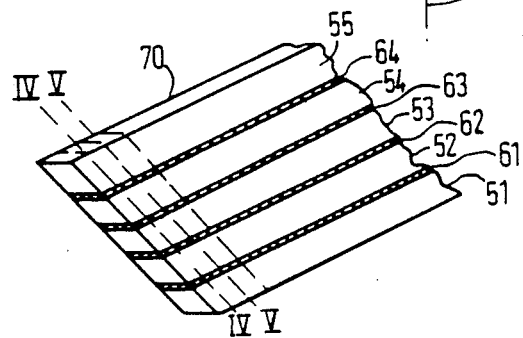

In the first step, a plate 50 of optically transparent material is coated with a filter layer 60, e.g., by vacuum evaporation. This operation is performed on several plates at a time, such that the plates are coated with layers selecting different wavelengths. The coated plates 51, 52, 53, 54, and 55 are then piled one on top of another and cemented together. The uppermost plate 55 need not be provided with a filter layer, because, in the finished condition of the multiplexer/demultiplexer, a portion of the upper side of this plate 55 will represent the right-hand side 5 of the device of FIG. 1, where a wavelength-independent total reflection takes place. It is, of course, also possible to provide this plate with a reflective coating for the wavelength of the last component beam. In FIG. 2b, the layers on the plates are designated by the reference characters 61, 62, 63, and 64. In the embodiment being described, the coated plates are piled one on top of another in such a way that a cross section gives a parallelogram. The straight line joining the edges of the individual plates is inclined to the normal 57 to the plates at an angle of 45°. This angle of inclination is equal to the angle at which the beam splitters are to be inclined to the principal-ray direction in the finished multiplexer/demultiplexer. From this pile, several slices are separated. The parting planes are determined by a straight line which is parallel to the straight line connecting the edges of the individual plates, and by a longitudinal edge 56 of the plates. In FIG. 2b, three separation lines I—I, II—II, and III—III are shown. Since the plates are piled one on top of another at the inclination at which the individual slices will be separated later, the amount of waste is kept to a minimum. FIG. 2c shows a single slice 70. It has the shape of a parallelepiped and is composed of the portions cut from the individual plates. In FIG. 2c, those portions of the coated plates which were cut from the plates piled one on top of another as shown in FIG. 2b are designated by the same reference characters as the plates of FIG. 2b. The material with which the plates are cemented together is chosen so as not to be optically disturbing; therefore, these joints are not shown in detail. From these slices 70, several pieces are separated. This is done in a direction normal to the individual dielectric layers 64, 63, 62, 61. FIG. 2c shows two such separation lines, namely the separation lines IV—IV and V—V.

Figure 2D:
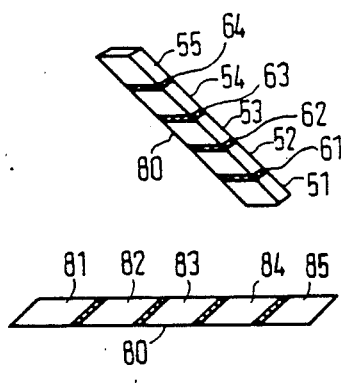

The separated pieces are the multiplexer/demultiplexers 80. The upper portion of FIG. 2d shows such a multiplexer/demultiplexer as cut from the slice 70 of FIG. 2c. In the lower portion of FIG. 2d, a single multiplexer/demultiplexer is shown in a longitudinal section corresponding to the longitudinal section of FIG. 1. The multiplexer/demultiplexer is composed of individual elements 81, 82, 83, 84, 85 all of which except the last element 85 are made of optically transparent material (plate 50, FIG. 2a) on which a filter layer (60, FIG. 2a) is deposited. The elements 81 to 85 correspond to the elements 105 to 109 of FIG. 1.

Prior to the separation of the individual pieces from the slices 70, the large surfaces of the slices 70 are ground and polished.

It is readily possible to choose the size of the individual plates and the pile of plates so that approximately 100 multiplexer/demultiplexers are obtained from one pile. If the multiplexer/demultiplexers were produced separately, the number of filter layers to be deposited on substrates would be one hundred times that required with the manufacturing method described. The cost of depositing the layers on the substrates is thus reduced considerably, and so is the amount of grinding and polishing work required. Assuming that 10 slices are obtained from one pile of plates, and 10 multiplexer/demultiplexers from each slice, the amount of polishing and grinding work required is reduced by a factor of 10, for 10 multiplexer/demultiplexers are ground and polished in a single operation, so to speak. If the individual multiplexer/demultiplexers are produced separately, and it is to be checked whether the layers were deposited so as to select precisely the desired wavelength, each individual multiplexer/demultiplexer must be tested. With the present manufacturing method, it suffices to test only one multiplexer/demultiplexer to ensure that the deposited layers have the prescribed values, for it can be assumed that the deposition on a plate by vacuum evaporation is uniform. As a result, the amount of testing work required with the novel manufacturing method is reduced considerably as well.

I claim:

1. An optical multiplexer/demultiplexer comprising:
   a plurality of optically transparent elements aligned along an optical axis;
   a plurality of optical filter elements, each of said optical filter elements being selected for a differing wavelength of light and acting as a wavelength selective beam splitter for the selected wavelength of light associated therewith, each one of said plurality of optical filter elements being interposed between adjacent ones of said plurality of transparent elements to form a unitary optical structure wherein each of said plurality of optically transparent elements and each of said plurality of optical filter elements in said unitary structure is aligned along said optical axis to form an elongate unitary structure;
   first input/output means for introducing/receiving multiple wavelength optical information to/from said elongate unitary structure, said first input/output means being disposed at an initial portion of said elongate unitary structure and positioned to introduce/receive multiple wavelength optical information to /from said elongate unitary structure in a direction transverse to said optical axis; and
   a plurality of second output/input means for receiving/introducing selected single wavelength optical information from/to said elongate unitary structure, each of said plurality of second output/input means being disposed at a portion of said elongate unitary structure to receive/introduce selected wavelength optical information from/to an associated one of said plurality of optical filter elements and positioned to receive/introduce said selected wavelength optical information in a direction transverse to said optical axis.

2. The optical multiplexer/demultiplexer according to claim 1 wherein N optically transparent elements and N−1 optical filter elements are present.

3. The optical multiplexer/demultiplexer according to claim 1 wherein each of said plurality of optical filter elements take the form of a wavelength selective layer coated on a surface of a selected one of said plurality of optically transparent elements.

4. The optical multiplexer/demultiplexer according to claim 1 wherein each of said plurality of optically transparent elements and said elongate unitary structure take the form of a parallelopiped having at least one surface portion which is inclined at a predetermined angle to said optical axis.

5. The optical multiplexer/demultiplexer according to claim 1 wherein said first input/output means and said plurality of second output/input means each include hemispherical lens means.

6. The optical multiplexer/demultiplexer according to claim 1 wherein each of said plurality of optically transparent elements is formed of optically active material which acts to rotate the plane of polarization of optical information being transmitted therethrough as a function of wavelength.

7. The optical multiplexer/demultiplexer according to claim 6 wherein thickness of each of said plurality of optically transparent elements is varied to rotate the plane of polarization for the selected wavelength at a predetermined one of said plurality of optical filter elements to increase the reflectance thereat.

8. The optical multiplexer/demultiplexer according to claim 7 wherein each of said plurality of optical filter elements takes the form of a wavelength selective layer coated on a surface of a selected one of said plurality of optically transparent elements.

9. The optical multiplexer/demultiplexer according to claim 8 wherein N optically transparent elements and N−1 optical filter elements are present.

10. The optical multiplexer/demultiplexer according to claim 9 wherein each of said plurality of optically transparent elements and said elongate unitary structure take the form of a parallelopiped having at least one surface portion which is inclined at a predetermined angle to said optical axis.

11. The optical multiplexer/demultiplexer according to claim 10 wherein said first input/output means and said plurality of second output/input means each include hemispherical lens means.

12. A method of making an optical multiplexer/demultiplexer comprising the steps of:
    forming N plates of optically transparent material;
    depositing an optical filter layer on at least N−1 of said plates, each optical filter layer deposited being selected for a differing wavelength of light and acting as a wavelength selective beam splitter for the wavelength of light selected;
    stacking and cementing in place each of said N plates;
    separating at least one composite layer from the stacked and cemented N plates by causing separation to occur along a pair of parallel planes intersecting said stacked and cemented N plates in a direction parallel to longitudinal edges of said N plates and at an oblique angle to a plane normal to said N plates; and
    configuring at least one parallelopied elongate body containing N optically transparent portions and at least N−1 optical filter layers from said composite layer.

13. The method of making an optical multiplexer/demultiplexer according to claim 12 wherein the step of stacking and cementing is performed by stacking each of said N plates in a staggered manner to form a pile having at least two sides which are aligned along an oblique angle.

14. The method of making an optical multiplexer/demultiplexer according to claim 12 additionally comprising the step of grinding and polishing said composite layer.

* * * * *